United States Patent
Yamamoto

(10) Patent No.: US 11,893,289 B1
(45) Date of Patent: Feb. 6, 2024

(54) PRINTER, NON-TRANSITORY COMPUTER-READABLE STORAGE MEDIUM STORING COMPUTER-READABLE INSTRUCTIONS FOR PRINTER, AND METHOD IMPLEMENTABLE BY PRINTER

(71) Applicant: Brother Kogyo Kabushiki Kaisha, Nagoya (JP)

(72) Inventor: Ryo Yamamoto, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 18/149,697

(22) Filed: Jan. 4, 2023

(30) Foreign Application Priority Data

Sep. 13, 2022 (JP) .................. 2022-145030

(51) Int. Cl.
  G06F 3/12 (2006.01)
(52) U.S. Cl.
  CPC .......... G06F 3/1218 (2013.01); G06F 3/1238 (2013.01); G06F 3/1285 (2013.01)
(58) Field of Classification Search
  CPC ..... G06F 3/1218; G06F 3/1238; G06F 3/1285
  See application file for complete search history.

(56) References Cited

U.S. PATENT DOCUMENTS

| | | | |
|---|---|---|---|
| 2010/0238501 A1 | 9/2010 | Fujimaki | |
| 2012/0212778 A1* | 8/2012 | Sakai | G06F 3/1214 358/1.15 |
| 2014/0313539 A1* | 10/2014 | Kawano | H04N 1/00339 358/1.14 |
| 2015/0002872 A1* | 1/2015 | Naruse | H04N 21/44227 358/1.13 |

FOREIGN PATENT DOCUMENTS

JP     2010-224768 A     10/2010

* cited by examiner

*Primary Examiner* — Benjamin O Dulaney
(74) *Attorney, Agent, or Firm* — BURR PATENT LAW, PLLC

(57) ABSTRACT

A printer includes a print engine and a controller. The controller is configured to cause the printer to perform: in response to image data being transmitted from a terminal to a server, receiving print data to be used in printing from the server, the image data representing a target image to be printed, the terminal being different from the printer; in response to receiving the print data from the server, transmitting a first notification to the server prior to completion of the printing of the target image, the first notification indicating that the printing of the target image has been completed; subsequent to the transmission of the first notification to the server, detecting a specific input; and in response to detecting the specific input, causing the print engine to perform the printing of the target image.

10 Claims, 9 Drawing Sheets

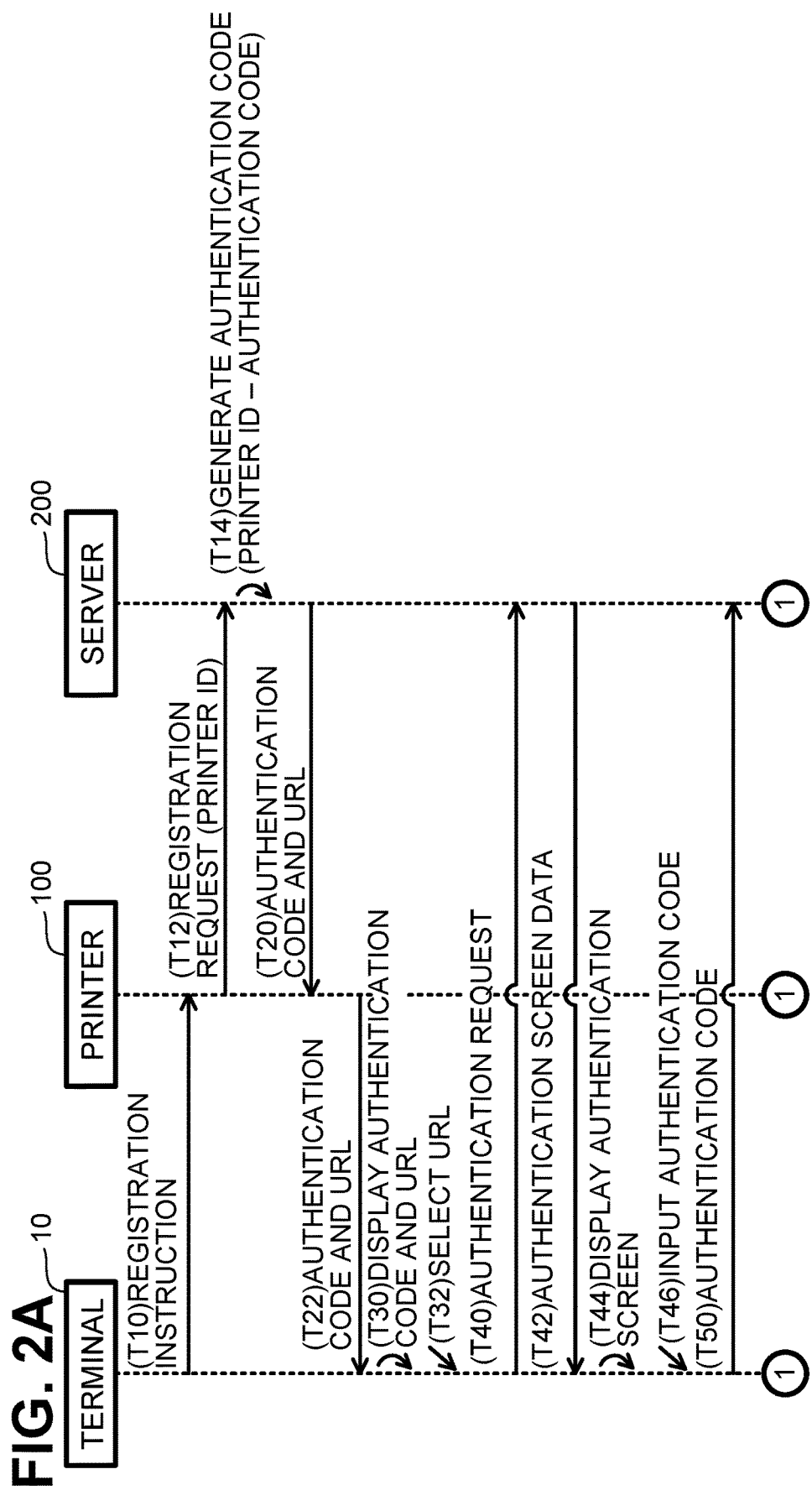

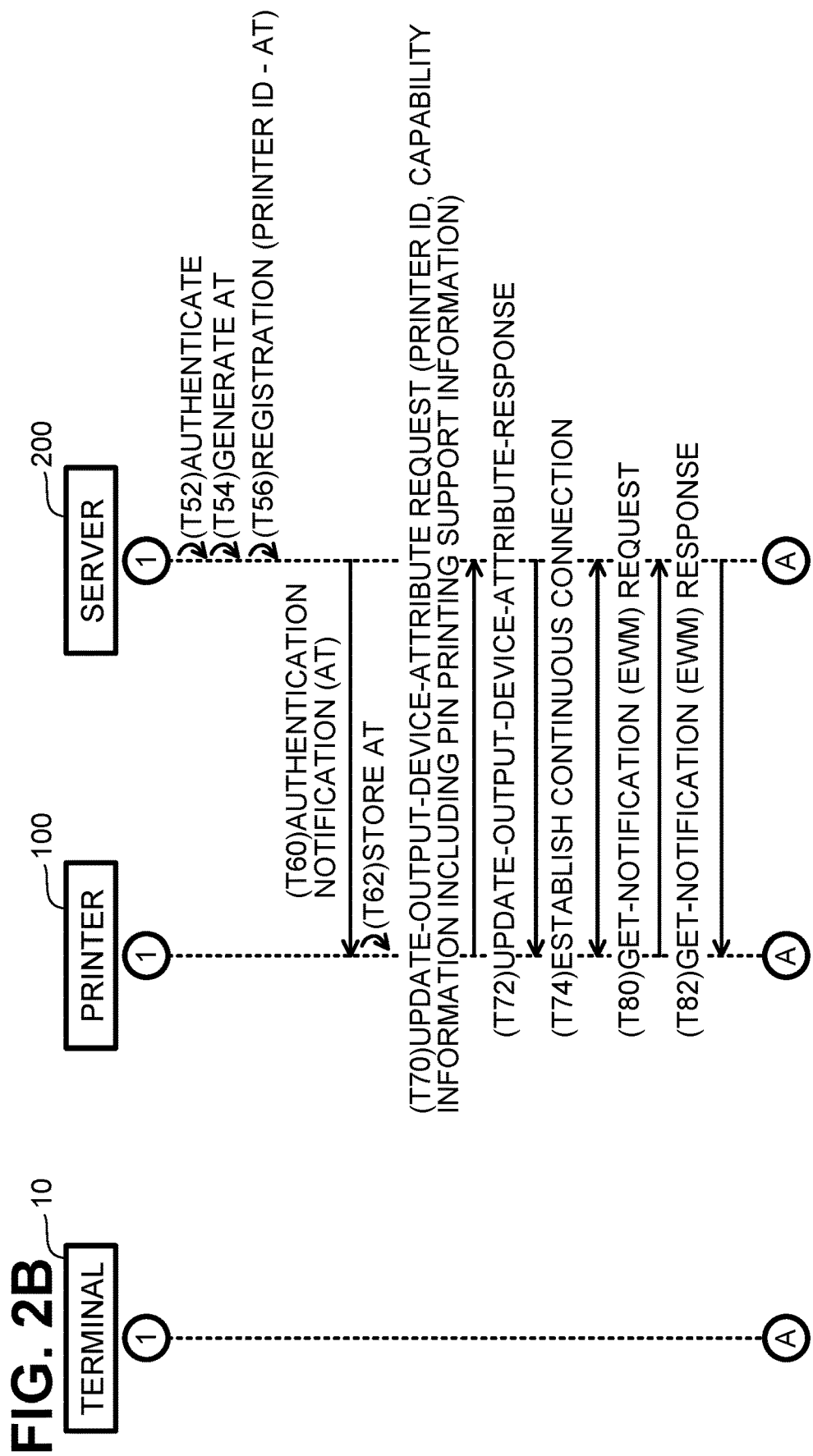

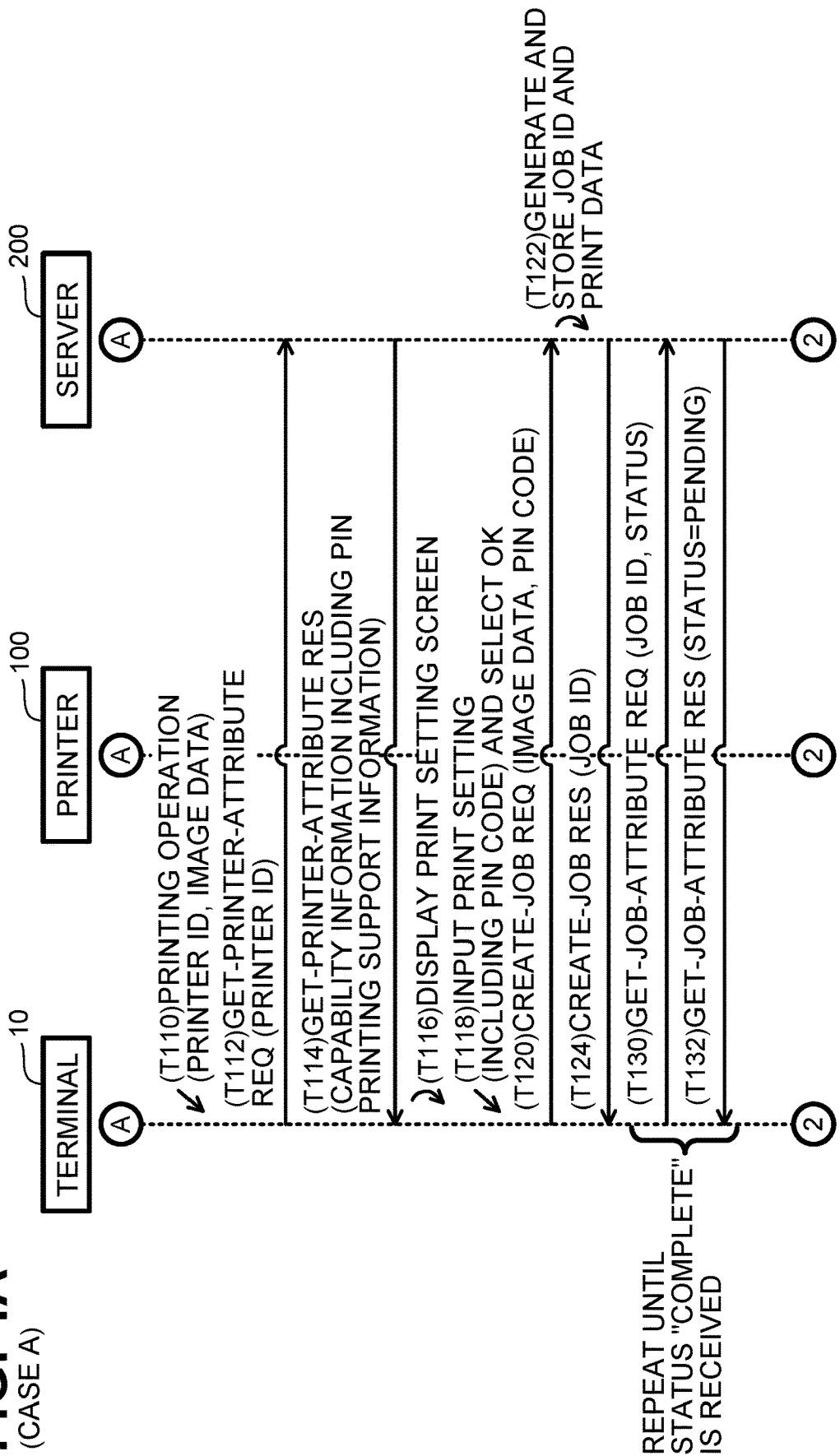

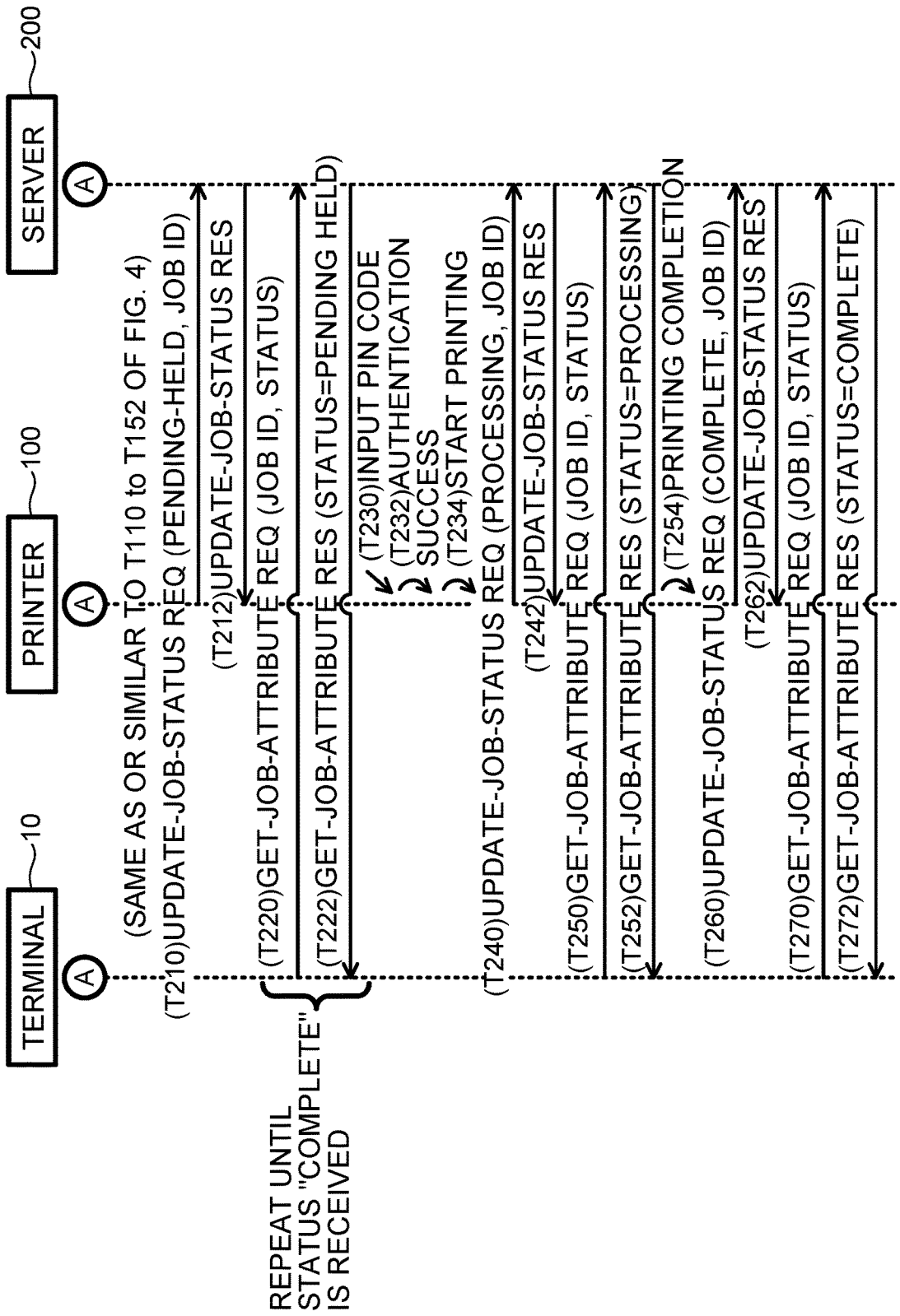

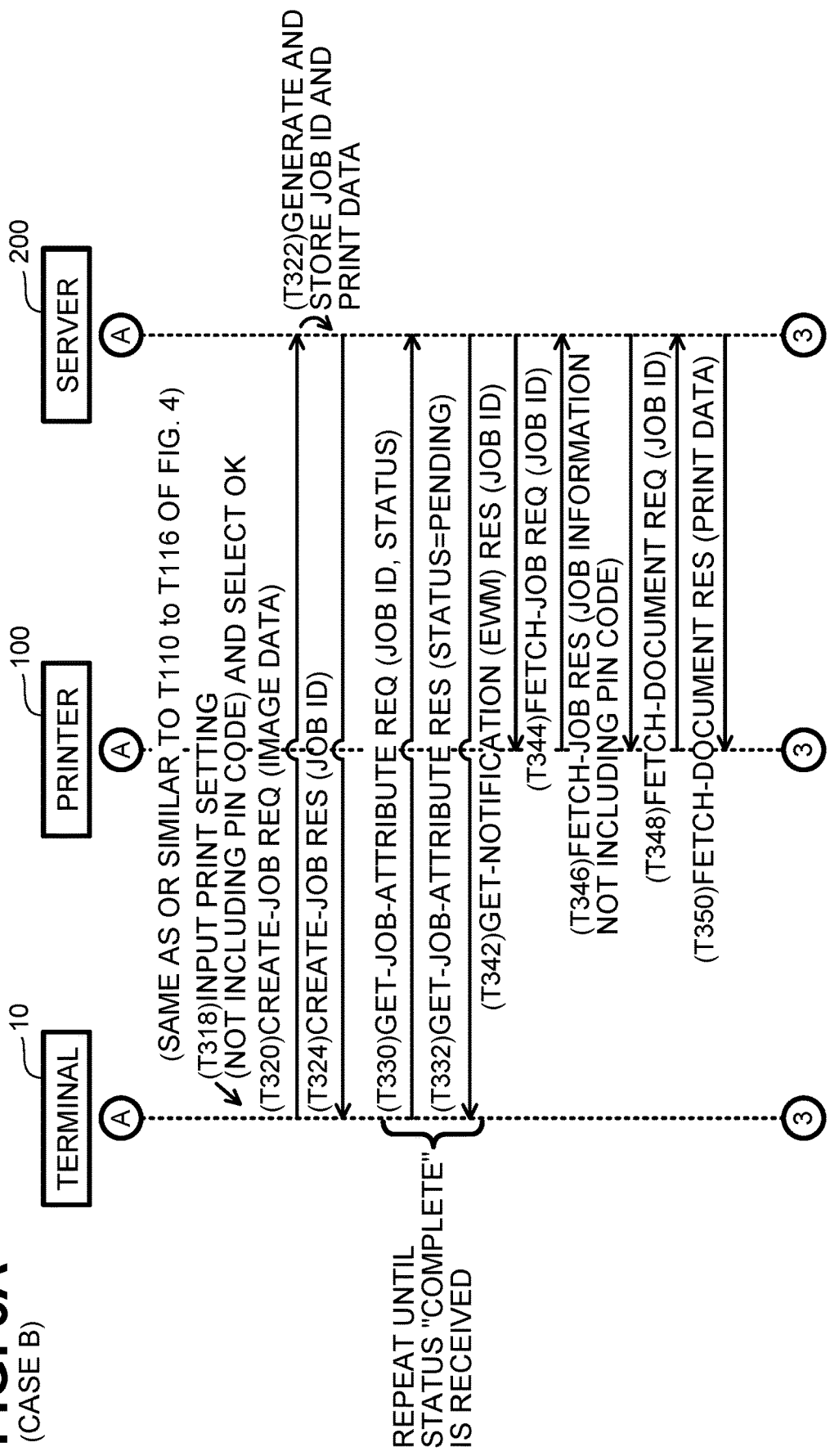

PRINTER, NON-TRANSITORY COMPUTER-READABLE STORAGE MEDIUM STORING COMPUTER-READABLE INSTRUCTIONS FOR PRINTER, AND METHOD IMPLEMENTABLE BY PRINTER

REFERENCE TO RELATED APPLICATIONS

This application claims priority from Japanese Patent Application No. 2022-145030 filed on Sep. 13, 2022. The entire content of the priority application is incorporated herein by reference.

BACKGROUND ART

A known printing system includes a printer, a client PC, and a server PC. In this printing system, the client PC transmits print data to the server PC. Thereafter, the printer performs authentication. In response to successful authentication, the server PC transmits the print data to the printer, and the printer performs printing in accordance with the print data.

DESCRIPTION

Aspects of the disclosure provides a technique that may reduce a processing load for communication to be placed on a server in a printing system including the server.

A printer according to an aspect of the disclosure may include a print engine and a controller. The controller is configured to cause the printer to perform: in response to image data being transmitted from a terminal to a server, receiving print data to be used in printing from the server, the image data representing a target image to be printed, the terminal being different from the printer; in response to receiving the print data from the server, transmitting a first notification to the server prior to completion of the printing of the target image, the first notification indicating that the printing of the target image has been completed; subsequent to the transmission of the first notification to the server, detecting a specific input; and in response to detecting the specific input, causing the print engine to perform the printing of the target image.

According to the above configuration, although the printing of the target image has not been completed, the printer may transmit, to the server, the first notification indicating that the printing of the target image has been completed. Compared to a case where the printer does not transmit the first notification to the server until the printing of the target image is completed, the above configuration may achieve less amount of data to be transmitted from the server after the server receives the first notification from the printer. This may thus reduce a processing load for communication to be placed on the server.

A computer program for implementing the above printer, a non-transitory computer-readable storage medium storing the computer program, and a method to be implemented by the above printer may have novelty and utility.

Figure 1:
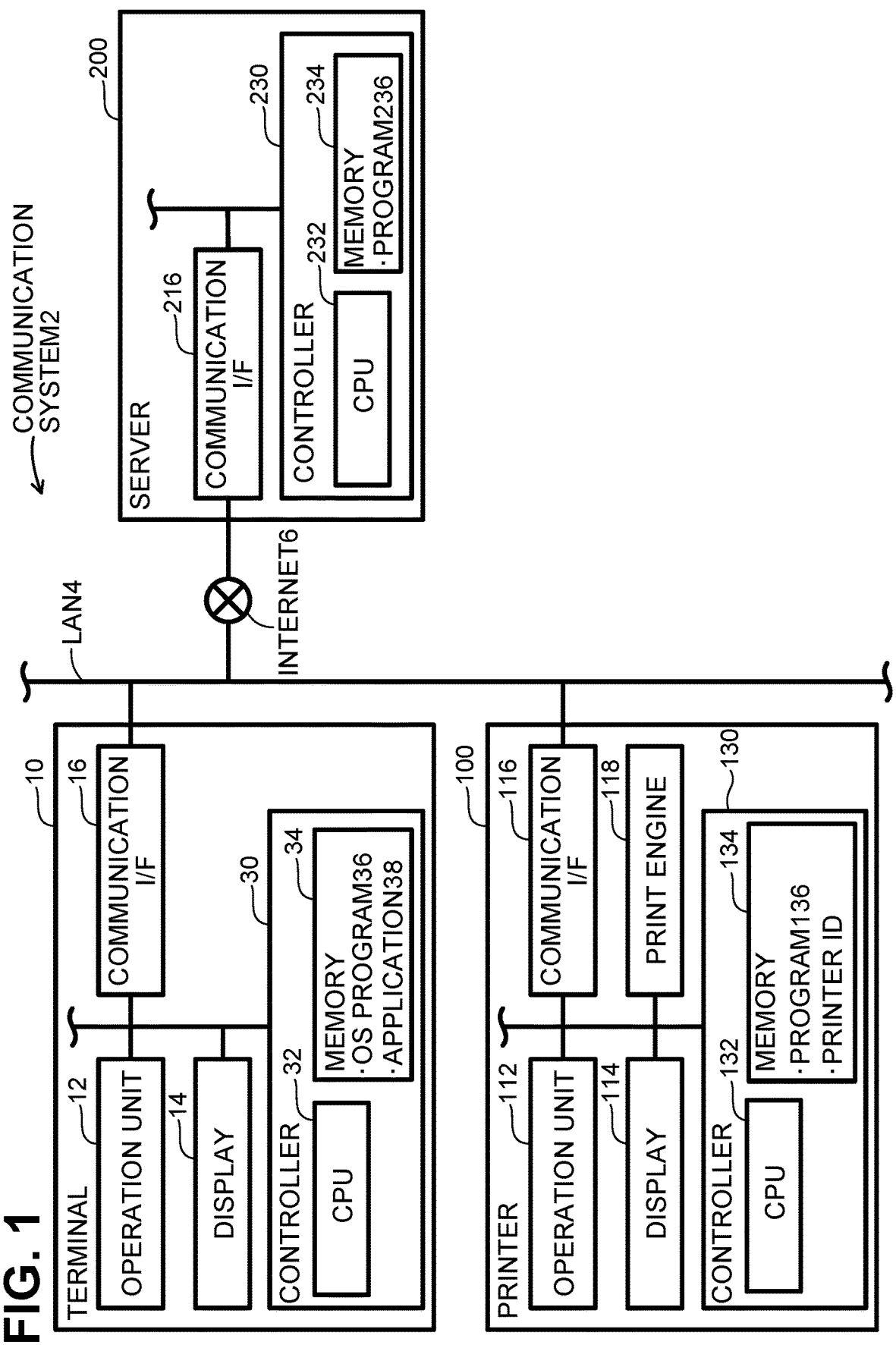
Figure 3:
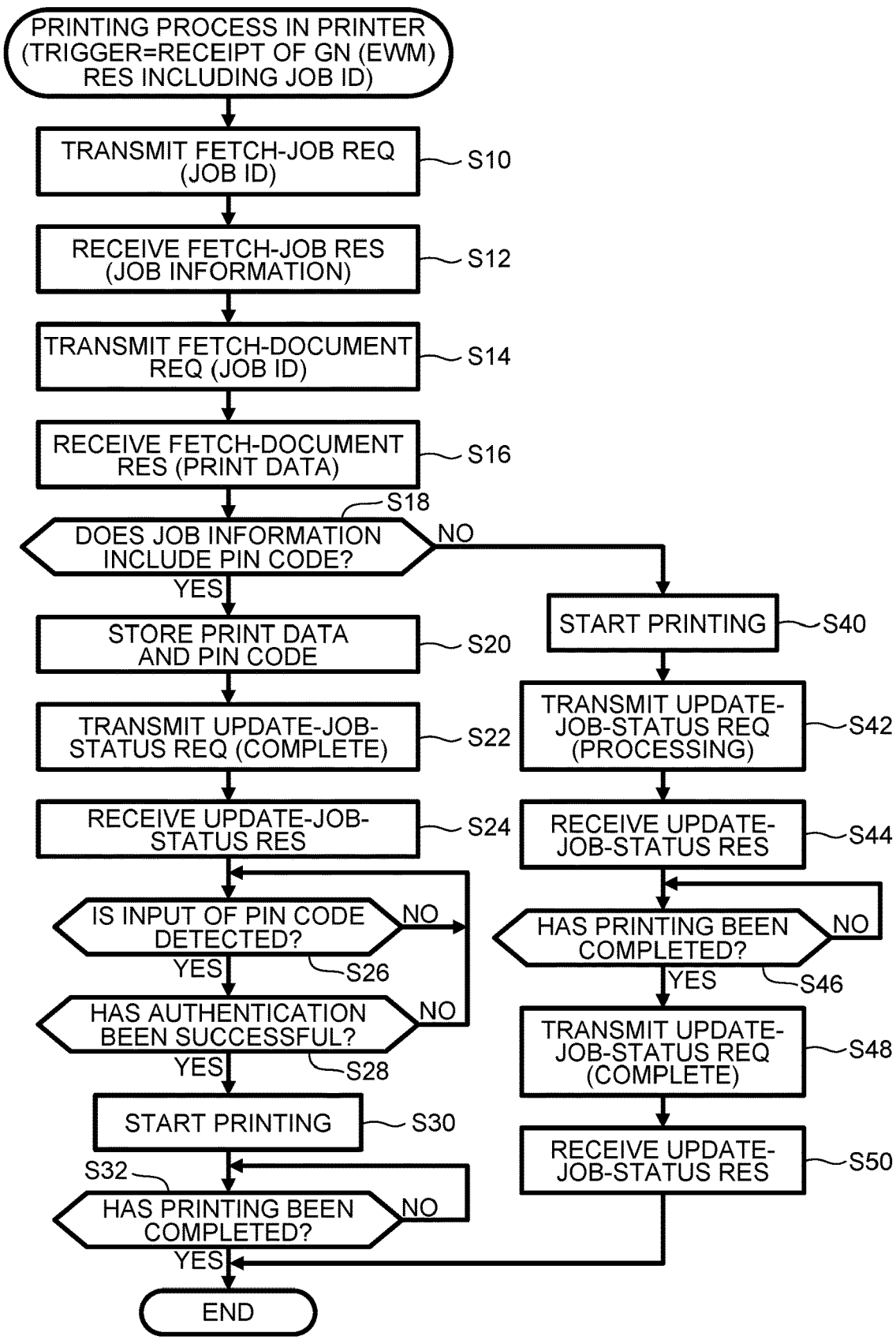
Figure 4B:
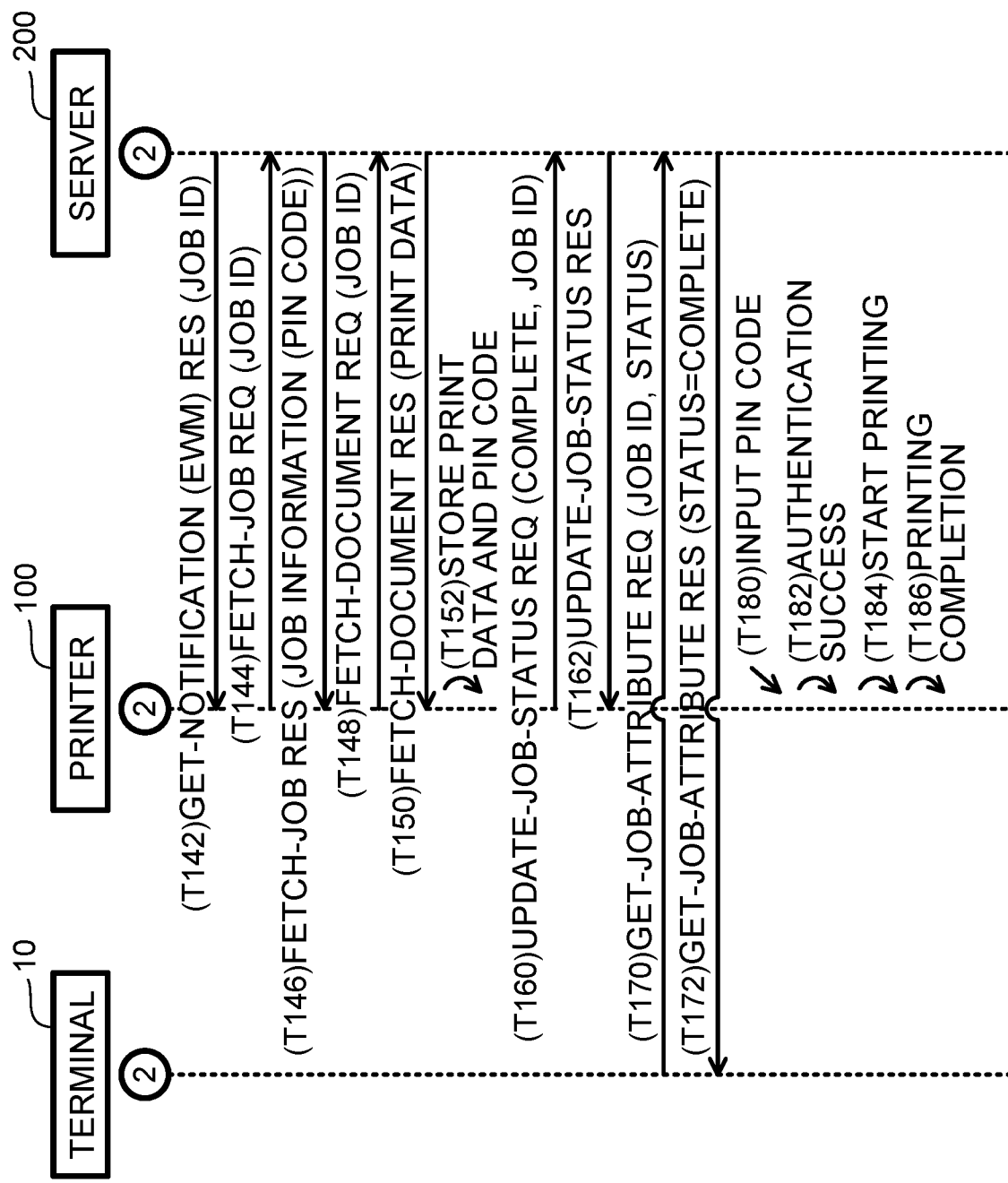
Figure 6B:
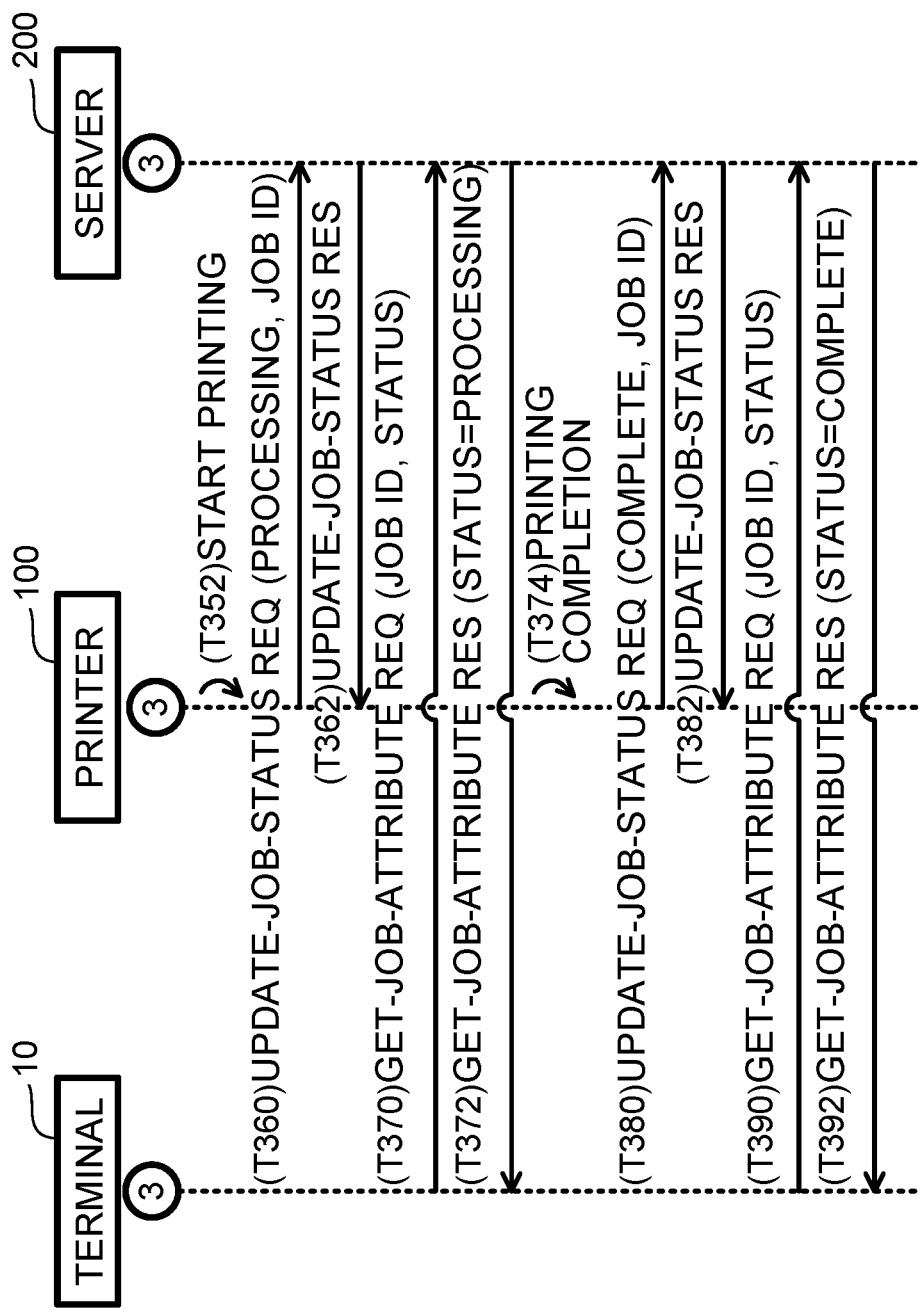

FIG. 1 is a configuration of a communication system.
FIG. 2A is a sequence diagram of a registration process.
FIG. 2B is a sequence diagram of a registration process continued from FIG. 2A.
FIG. 3 is a flowchart of a printing process.
FIG. 4A is a sequence diagram of Case A.
FIG. 4B is a sequence diagram of Case A continued from FIG. 4A.
FIG. 5 is a sequence diagram of a comparative example.
FIG. 6A is a sequence diagram of Case B.
FIG. 6B is a sequence diagram of Case B continued from FIG. 6A.

CONFIGURATION OF COMMUNICATION SYSTEM 2; FIG. 1

As illustrated in FIG. 1, a communication system 2 includes a terminal 10, a printer 100, and a server 200. The terminal 10 and the printer 100 are connected to a local area network (LAN) 4. The LAN 4 is a wireless LAN configured by an access point. In other embodiments, for example, the LAN 4 may be a wired LAN. The terminal 10 and the printer 100 are configured to communicate with each other via the LAN 4. The LAN 4 is connected to the Internet 6. The server 200 is connected to the Internet 6. Therefore, each of the terminal 10 and the printer 100 is configured to communicate with the server 200 via the LAN 4 and the Internet 6.

Configuration of Terminal 10

The terminal 10 may be a mobile device such as a mobile phone, a smartphone, a PDA, a tablet PC, or a laptop PC. In other embodiments, for example, the terminal 10 may be a stationary PC. The terminal 10 includes an operation unit 12, a display unit 14, a communication interface 16, and a controller 30, each of which is connected to a bus line. Hereinafter, an interface is referred to as an "I/F".

The operation unit 12 is an I/F that enables a user to enter various kinds of information to the terminal 10, and includes, for example, a touch screen, physical buttons, or both. The display unit 14 includes a display for displaying various kinds of information. The communication I/F 16 is connected to the LAN 4.

The controller 30 includes a CPU 32 and a memory 34. The memory 34 stores an operating system (OS) program 36 and an application program 38. The CPU 32 executes various processing in accordance with the OS program 36 and the application program 38 stored in the memory 34. The memory 34 may be, for example, a read-only memory (ROM) or a random-access memory (RAM). The OS program 36 realizes basic operations of the terminal 10. The application program 38 causes a printer (e.g., the printer 100) to perform printing. Hereinafter, the OS program 36 is referred to as an "OS 36". The application program 38 is referred to as an "application 38". The application 38 is downloaded from a particular server on the Internet and installed on the terminal 10. The particular server is provided by a vendor of the OS 36 or by a vendor of the printer 100.

Configuration of Printer 100

The printer 100 is capable of performing a printing function, and may be, for example, a peripheral device for the terminal 10. In other embodiments, for example, the printer 100 may be a multi-function device capable of performing one or more other functions such as a scanning function and a facsimile function in addition to the printing function. The printer 100 includes an operation unit 112, a display unit 114, a communication I/F 116, a print engine 118, and a controller 130, each of which is connected to a bus line.

The operation unit 112 may be an I/F that enables the user to enter various kinds of information to the terminal 100, and includes, for example, a touch screen, physical buttons, or both. The display unit 114 includes a display for displaying various kinds of information. The communication I/F 116 is connected to the LAN 4. The print engine 118 includes, for example, an inkjet printing mechanism or a laser printing mechanism.

The controller 130 includes a CPU 132 and a memory 134. The memory 134 stores a program 136. The CPU 132 executes various processing in accordance with the program 136. The memory 134 further stores a printer ID that may be unique information identifying the printer 100.

Configuration of Server 200

The server 200 provides a cloud print service. In the illustrative embodiment, the server 200 may be provided by a provider that provides the cloud print service. Nevertheless, in other embodiments, for example, the server 200 may be installed by the vendor of the printer 100. The server 200 includes a communication I/F 216 and a controller 230. The communication I/F 216 and the controller 230 are connected to a bus line. The communication I/F 216 is connected to the Internet 6.

The controller 230 includes a CPU 232 and a memory 234. The memory 234 stores a program 236. The CPU 232 executes various processing in accordance with the program 236.

Registration Process; FIGS. 2A and 2B

With reference to FIGS. 2A and 2B, a description will be provided on a registration process for registering information on the printer 100 with the server 200. This process enables the printer 100 to obtain the cloud print service provided by the server 200. In the description of FIGS. 2A and 2B, each device (e.g., the terminal 10, the printer 100, or the server 200) but not a CPU (e.g., the CPU 32, the CPU 132, or the CPU 232) of each device is regarded as a doer of processing executed by the CPU (e.g., the CPU 32, the CPU 132, or the CPU 232). Although the CPU 32 of the terminal 10 executes various processes in accordance with the application 38, the terminal 10, instead of the application 38, is regarded as a doer of the processes. Communication between the devices is performed via their respective communication I/Fs (e.g., the communication I/F 16, the communication I/F 116, or the communication I/F 216). Therefore, the phrase "via the communication I/F" may be omitted when processing relating to communication via the communication I/F is described. The same applies to the description of FIGS. 4 to 6.

The terminal 10 activates the application 38 in response to detecting a user operation, and accesses a web server embedded in the printer 100 using the application 38. In response to the printer 100 detecting a user operation for requesting provision of the cloud print service, in T10, the terminal 10 transmits a registration instruction to the printer 100.

In response to, in T10, receiving the registration instruction from the terminal 10, in T12, the printer 100 transmits a registration request to the server 200. The registration request includes a printer ID that may be information identifying the printer 100.

In response to, in T12, receiving the registration request from the printer 100, in T14, the server 200 generates an authentication code, and stores the generated authentication code in the memory 234 in association with the printer ID included in the registration request.

In T20, the server 200 transmits the authentication code and a login URL to the printer 100. The login URL indicates a location of authentication screen data in the server 200. The authentication screen data represents an authentication screen for enabling the user to enter the authentication code to the terminal 10.

In response to, in T20, receiving the authentication code and the login URL from the server 200, in T22, the printer 100 transmits the authentication code and the login URL to the terminal 10.

In response to, in T22, receiving the authentication code and the login URL from the printer 100, in T30, the terminal 10 displays the authentication code and the login URL on the display unit 14. Subsequent to T30, in response to, in T32, detecting input indicating a user operation for selecting the login URL displayed on the display unit 14, in T40, the terminal 10 transmits an authentication request including the login URL to the server 200.

In response to, in T40, receiving the authentication request from the terminal 10, in T42, the server 200 transmits, to the terminal 10, the authentication screen data specified by the login URL included in the authentication request.

In response to, in T42, receiving the authentication screen data from the server 200, in T44, the terminal 10 displays the authentication screen represented by the authentication screen data on the display unit 14. The user thus may enter, into the terminal 10, the authentication code displayed on the display unit 14 in T30. In response to, in T46, detecting input of the authentication code entered by the user, in T50, the terminal 10 transmits the inputted authentication code to the server 200.

In response to, in T50, receiving the authentication code from the terminal 10, in T52, the server 200 authenticates the received authentication code. Specifically, the server 200 determines whether the received authentication code matches the authentication code stored in the memory 234. In this example, the authentication code received in T50 matches the authentication code stored in the memory 234 (in T14). Thus, in T54, the server 200 generates an access token that is a unique character string. Hereinafter, the access token is referred to as an "AT". In T56, the server 200 stores the printer ID and the generated AT in the memory 234 in association with each other. In T60, the server 200 transmits an authentication notification including the generated AT to the printer 100.

In response to, in T60, receiving the authentication notification from the server 200, in T62, the printer 100 stores the AT included in the authentication notification in the memory 134.

In T70, the printer 100 transmits an Update-Output-Device-Attribute Request to the server 200. Hereinafter, the Update-Output-Device-Attribute is referred to as a "UODA". The Request is referred to as a "Req". The UODA Req is a signal for requesting the server 200 to register capability information on the printer 100. The capability information on the printer 100 includes, for example, printing conditions supported by the printer 100. In addition, the capability information includes the printer ID of the printer 100 and PIN printing support information indicating that the printer 100 supports PIN printing. The PIN printing is performed in response to entry of a PIN code assigned by the user to the printer 100.

In response to, in T70, receiving the UODA Req from the printer 100, the server 200 registers the capability information included in the UODA Req in association with the printer ID of the printer 100. In T72, the server 200 transmits, to the printer 100, a UODA Response that is a response to the UODA Req. Hereinafter, the Response is referred to as a "Res".

Subsequent to T72, in T74, a continuous connection is established between the printer 100 and the server 200 using the AT. Through the continuous connection, the server 200 is enabled to transmit a request to the printer 100 through a firewall of the LAN 4 to which the printer 100 belongs without receiving a request from the printer 100. The continuous connection may be, for example, an extensible messaging and presence protocol (XMPP) connection or a connection in accordance with hypertext transfer protocol secure (HTTPS).

In T80, the printer 100 transmits a Get-Notification (Event Wait Mode) Req to the server 200. Hereinafter, the Get-Notification is referred to as a "GN". The Event Wait Mode is referred to as an "EWM". The GN (EWM) Req is a signal for requesting the server 200 to transmit, to the printer 100, a notification that generation of print data has been completed, in response to the server 200 completing the generation of the print data.

In T80, the server 200 receives the GN (EWM) Req from the printer 100. In T82, the server 200 transmits, to the printer 100, a GN (EWM) Res that is a response to the GN (EWM) Req.

Printing Process in Printer 100; FIG. 3

A printing process executed by the CPU 132 of the printer 100 will be described with reference to FIG. 3. The printing process of FIG. 3 starts in response to the printer 100 receiving the GN (EWM) Res including a Job ID from the server 200. In the following description of FIG. 3, the print job identified by the Job ID is referred to as a "target print job".

In S10, the CPU 132 transmits a Fetch-Job Req to the server 200 via the communication I/F 116. Hereinafter, the Fetch-Job is referred to as an "FJ". The FJ Req includes the Job ID. The FJ Req is a signal for requesting the server 200 to transmit job information on the target print job.

In S12, the CPU 132 receives an FJ Res from the server 200 via the communication I/F 116. The FJ Res includes the job information on the target print job. The job information includes, for example, a Job ID and printing conditions for printing to be performed in accordance with the target print job. The printing conditions include, for example, a sheet size and print quality. In a case where the printing to be performed in accordance with the target print job is the PIN printing, the job information includes a PIN code. In a case where the printing to be performed in accordance with the target print job is not the PIN printing, the job information does not include a PIN code.

In S14, the CPU 132 transmits a Fetch-Document Req to the server 200 via the communication I/F 116. Hereinafter, the Fetch-Document is referred to as an "FD". The FD Req includes the Job ID. The FD Req is a signal for requesting the server 200 to transmit print data representing an image to be printed in accordance with the target print job. Hereinafter, the image to be printed in accordance with the target print job is referred to as a "target image". The print data representing the target image is referred to as "target print data".

In S16, the CPU 132 receives an FD Res from the server 200 via the communication I/F 116. The FD Res includes the target print data. As described above, the printer 100 may receive the target print data from the server 200 through communication in S10 to S16.

In S18, the CPU 132 determines whether the job information (refer to S12) includes a PIN code. That is, the CPU 132 determines whether the printing to be performed in accordance with the target print job is the PIN printing. If the CPU 132 determines that the job information includes a PIN code (i.e., the printing to be performed in accordance with the target print job is the PIN printing) (YES: S18), the routine proceeds to S20. If the CPU 132 determines that the job information does not include a PIN code (i.e., the printing to be performed in accordance with the target print job is not the PIN printing) (NO: S18), the routine proceeds to S40. The printer 100 may thus determine processing to be executed subsequent to the processing of S18 depending on whether the printing to be performed in accordance with the target print job is the PIN printing.

In S20, the CPU 132 stores, in the memory 134, the target print data (refer to S16) included in the FD Res and the PIN code included in the job information in association with each other.

In S22, the CPU 132 transmits an Update-Job-Status Req (Complete) to the server 200 via the communication I/F 116. Hereinafter, the Update-Job-Status is referred to as a "UJS". The UJS Req (Complete) is a signal indicating that the printing in accordance with the target print job has been completed, that is, a status of the target print job has been changed. The UJS Req (Complete) includes the Job ID identifying the target print job. At the time of S22, the printing in accordance with the target print job has not yet been completed. That is, although the printing has not been completed, the printer 100 transmits, to the server 200, the UJS Req (Complete) indicating that the printing has been completed.

In S24, the CPU 132 receives a UJS Res that is a response to the UJS Req (Complete) from the server 200 via the communication I/F 116.

In S26, the CPU 132 monitors input of the PIN code entered by the user. In response to detecting the input of the PIN code through the operation unit 112 (YES: S26), the routine proceeds to S28.

In S28, the CPU 132 determines whether the authentication has been successful. Specifically, the CPU 132 determines whether the inputted PIN code matches the PIN code stored in the memory 134 (refer to S20). If the CPU 132 determines that the inputted PIN code matches the PIN code stored in the memory 134 (YES: S28), the routine proceeds to S30. If the CPU 132 determines that the inputted PIN code does not match the PIN code stored in the memory 134 (NO: S28), the routine returns to S26. The printing is performed only if the authentication of the PIN code is successful, thereby ensuring secure printing.

In S30, the CPU 132 provides the target print data to the print engine 118, and causes the print engine 118 to start printing in accordance with the target print job. The target print data is the print data that has been received in S16 and that is stored in the memory 134 in association with the authenticated PIN code.

In S32, the CPU 132 monitors completion of the printing started in S30. If the CPU 132 determines that the printing has been completed (YES: S32), the printing process of FIG. 3 ends.

In S40, the CPU 132 provides the target print data to the print engine 118, and causes the print engine 118 to start printing in accordance with the target print job. The target print data is the print data that has been received in S16.

In S42, the CPU 132 transmits a UJS Req (Processing) to the server 200 via the communication I/F 116. The UJS Req (Processing) is a signal indicating that the printing in accordance with the target print job is being performed, that is, the status of the target print job has been changed. The UJS Req (Processing) includes the Job ID identifying the target print job.

In S44, the CPU 132 receives a UJS Res that is a response to the UJS Req (Processing) from the server 200 via the communication I/F 116.

In S46, the CPU 132 monitors completion of the printing started in S40. If the CPU 132 determines that the printing has been completed (YES: S46), the routine proceeds to S48.

In S48, the CPU 132 transmits a UJS Req (Complete) to the server 200 via the communication I/F 116. That is, in a case where the job information does not include a PIN code, the printer 100 transmits a signal indicating the updated status of the target print job to the server 200 every time the status of the target print job is changed.

In S50, the CPU 132 receives a UJS Res that is a response to the UJS Req (Complete) from the server 200 via the communication I/F 116. In response to completion of S50, the printing process of FIG. 3 ends.

Case A; FIGS. 4A and 4B

Referring to FIGS. 4A and 4B, a description will be provided on Case A implemented by the printing process of FIG. 3. FIG. 4A is a sequence diagram continued from T82 in FIG. 2B.

In T110, the terminal 10 detects input indicating a user operation for starting printing. The user operation includes designation of the printer ID of the printer 100 and designation of image data representing an image to be printed. In response to the server 200 registering therewith the information on the printer 100 in FIGS. 2A and 2B, the terminal 10 receives, from the server 200, a list of one or more printer IDs stored in the server 200, and stores the list in the memory 34. The user may thus designate the printer ID of the printer 100 registered with the server 200 from the list of one or more printer IDs stored in the memory 34.

In T112, the terminal 10 transmits a Get-Printer-Attribute Req to the server 200.

Hereinafter, the Get-Printer-Attribute is referred to as a "GPA". The GPA Req includes the printer ID designated in T110. The GPA Req is a signal for requesting the server 200 to transmit the capability information on the printer 100.

In response to, in T112, receiving the GPA Req from the terminal 10, in T114, the server 200 transmits a GPA Res to the terminal 10. The GPA Res includes the capability information on the printer 100 identified by the designated printer ID. In this embodiment, the capability information includes the PIN printing support information (refer to T70 in FIG. 2B).

In response to, in T114, receiving the GPA Res from the server 200, in T116, the terminal 10 displays a print setting screen on the display unit 14. The print setting screen enables the user to designate various print settings for the printing. The print settings include one or more settings of, for example, sheet size, color printing, monochrome printing, single-sided printing, or double-sided printing. In Case A, the capability information included in the GPA Res includes the PIN printing support information. The print setting screen thus includes an entry field for enabling the user to assign a PIN code. Therefore, the user may assign any PIN code to be used for starting printing in accordance with the target print job by entering the PIN code in the entry field.

In T118, the terminal 10 detects input indicating a user selection of an OK button on the print setting screen after the print settings are determined and the PIN code is assigned by the user. In response to the detection, in T120, the terminal 10 transmits a Create-Job Req to the server 200. Hereinafter, the Create-Job is referred to as a "CJ". The CJ Req is a signal for requesting the server 200 to generate a print job. The CJ Req includes the image data designated in T110 and the PIN code assigned in T118.

In response to, in T120, receiving the CJ Req from the terminal 10, in T122, the server 200 generates a Job ID and print data, and stores the Job ID and the print data in the memory 234 in association with each other. The print data has a data format that can be interpreted by the printer 100. The server 200 generates the print data by converting the image data included in the CJ Req. The server 200 stores, in the memory 234, status information indicating the current status, such as "Pending" or "Complete", of the print job in association with the Job ID. At this moment, the server 200 has not provided the printer 100 with the print data, and thus the status information of the print job indicates the status "Pending". In T124, the server 200 transmits, to the terminal 10, a CJ Res that is a response to the CJ Req. The CJ Res includes the generated Job ID.

In response to, in T124, receiving the CJ Res from the server 200, in T130, the terminal transmits a Get-Job-Attribute Req including the Job ID to the server 200. Hereinafter, the Get-Job-Attribute is referred to as a "GJA". The GJA Req is a signal for requesting the server 200 to transmit the status information indicating the current status of the print job.

In response to, in T130, receiving the GJAReq from the terminal 10, in T132, the server 200 transmits, to the terminal 10, a GJA Res that is a response to the GJA Req. The GJA Res includes the status information indicating the status "Pending" stored in association with the Job ID.

In T132, the terminal 10 receives the GJA Res from the server 200. The terminal 10 repeats the processing of T132 until the terminal 10 receives the GJA Res including the status information indicating the status "Complete". In other words, the terminal 10 periodically requests the server 200 to transmit the status information indicating the current status of the print job until the print job is completed.

In response to, in T122, generating the Job ID and the print data, in T142, the server 200 transmits a GN (EWM) Res to the printer 100. The GN (EWM) Res includes the generated Job ID.

In T142, the printer 100 receives the GN (EWM) Res including the Job ID from the server 200. Execution of T142 may be a trigger for causing the CPU 132 of the printer 100 to start the printing process of FIG. 3. In T144, the printer 100 transmits an FJ Req including the Job ID to the server 200 (refer to S10 of FIG. 3).

In response to, in T144, receiving the FJ Req including the Job ID from the printer 100, in T146, the server 200 transmits an FJ Res including the job information to the printer 100. In Case A, the PIN code has been assigned by the user on the print setting screen of the terminal 10 (refer to T118), and thus the job information includes the PIN code.

In response to, in T146, receiving the FJ Res from the server 200 (refer to S12), in T148, the printer 100 transmits an FD Req including the Job ID to the server 200 (refer to S14).

In response to, in T148, receiving the FD Req from the printer 100, in T150, the server 200 transmits, to the printer 100, the FD Res including the print data (refer to T122). The print data is associated with the Job ID included in the FD Req.

In T150, the printer 100 receives the FD Res including the print data from the server 200 (refer to S16). In Case A, the job information included in the FJ Res includes the PIN code (S18: YES). Thus, in T152, the printer 100 stores the print data and the PIN code in the memory 134 in association with each other (refer to S20). That is, the printer 100 does not start the printing in accordance with the received print data immediately after receiving the FJ Res.

In T160, the printer 100 transmits, to the server 200, a UJS Req (Complete) including the Job ID (refer to S22).

In response to, in T160, receiving the UJS Req (Complete) including the Job ID from the printer 100, the server 200 stores the status information indicating the status "Complete" in the memory 234 in association with the Job ID. In T162, the server 200 transmits the UJS Res to the printer 100. In steps subsequent to T162, the printer 100 does not transmit a UJS Req to the server 200.

In T170, the terminal 10 transmits the GJA Req to the server 200 again. T170 is the same as or similar to T130.

In response to, in T170, receiving the GJA Req from the terminal 10, in T172, the server 200 transmits a GJA Res to the terminal 10. The GJA Res includes the status information indicating the status "Complete" stored in association with the Job ID.

In T172, the terminal 10 receives, from the server 200, the GJA Res including the status information indicating the status "Complete". Thus, in steps subsequent to T172, the terminal 10 does not transmit a GJA Req to the server 200.

In response to, in T162, receiving the UJS Res from the server 200 (refer to S24), in T180, the printer 100 detects input of the PIN code entered by the user (S26: YES). In Case A, the authentication of the PIN code is successful in T182 (S28: YES), and thus, in T184, the printer 100 starts the printing in accordance with the print data (refer to S30). Thereafter, in T186, the printer 100 completes the printing (S32: YES).

As described above, prior to completion of the printing, the printer 100 transmits, to the server 200, the UJS Req (Complete) indicating that the printing has been completed. Hereinafter, referring to FIG. 5, a description will be provided on a comparative example in which the printer 100 transmits a UJS Req (Complete) to the server 200 after completing the printing.

Comparative Example; FIG. 5

FIG. 5 is a sequence diagram continued from T82 in FIG. 2B. Subsequent to T82, the terminal 10, the printer 100, and the server 200 each execute appropriate one or more processing that is the same as or similar to the processing executed in T110 to T152 of FIGS. 4A and 4B. That is, tin response to receiving the print data from the server 200, the printer 100 stores the print data and the PIN code in the memory 134 in association with each other without starting the printing immediately (refer to T152 of FIG. 4B). In T210, the printer 100 transmits, to the server 200, a UJS Req (Pending-Held) including the Job ID. The UJS Req (Pending-Held) is a signal indicating that although the printer 100 had already received the print data from the server 200, the printer has not yet started the printing in accordance with the print data.

In response to, in T210, receiving the UJS Req (Pending-Held) including the Job ID from the printer 100, the server 200 stores status information indicating a status "Pending-Held" in the memory 234 in association with the Job ID. In T212, the server 200 transmits the UJS Res to the printer 100. T220 and T222 are the same as or similar to T130 and T132 in FIG. 4A, respectively, except that the status information indicates the status "Pending-Held". T230 to T234 are the same as or similar to T180 to T184 in FIG. 4B, respectively.

In T240, the printer 100 transmits, to the server 200, a UJS Req (Processing) including the Job ID.

In response to, in T240, receiving the UJS Req (Processing) including the Job ID from the printer 100, the server stores the status information indicating the status "Processing" in the memory 234 in association with the Job ID. In T242, the server 200 transmits the UJS Res to the printer 100. T250 and T252 are the same as or similar to T130 and T132 of FIG. 4A, respectively, except that the status information indicates the status "Processing".

T254 is the same as or similar to T186. T260 to T272 are the same as or similar to T160 to T172 in FIG. 4B, respectively. That is, in T254 and T260 in the comparative example, the printer 100 transmits the UJS Req (Complete) to the server 200 after completing the printing.

Effects

In the comparative example of FIG. 5, each time the status of the print job is changed, the printer 100 transmits the UJS Req to the server 200 and receives the UJS Res from the server 200. Specifically, the printer 100 transmits three UJS Reqs to the server 200. That is, the printer 100 sequentially transmits, to the server 200, the UJS Req (Pending-Held) (refer to T210 of FIG. the UJS Req (Processing) (refer to T240 of FIG. 5), and the UJS Req (Complete) (refer to T260 of FIG. 5). On the other hand, in the illustrative embodiment, although the printing in accordance with the print job has not been completed, the printer 100 transmits, to the server 200, the UJS Req (Complete) indicating that the printing has been completed (refer to T160 of FIG. 4B). Thus, even if the status of the print job is changed thereafter, the printer 100 does not transmit the UJS Req to the server 200. Compared to the comparative example, such technique according to the illustrative embodiment may reduce the amount of data to be transmitted between the server 200 and the printer 100, thereby reducing a processing load for communication to be placed on the server 200 and the printer 100.

In the comparative example, communication, specifically, communication for transmission and reception of the GJA Req and the GJA Res is repeatedly performed between the terminal 10 and the server 200 until the printing in accordance with the print job is completed in the printer 100. In the illustrative embodiment, although the printing in accordance with the print job has not been completed, the printer 100 transmits, to the server 200, the UJS Req (Complete) indicating that the printing has been completed. In response to receiving the UJS Req (Complete), the server 200 transmits the GJA Res including the status information indicating the status "Complete" to the terminal 10. From then, therefore, communication for transmission and reception of the GJA Req and the GJA Res is not performed between the terminal 10 and the server 200. Compared to the comparative example, such technique according to the illustrative embodiment may reduce the amount of data to be transmitted between the server 200 and the terminal 10, thereby reducing the processing load for communication to be placed on the server 200 and the terminal 10.

Case B; FIGS. 6A and 6B

Referring to FIGS. 6A and 6B, a description will be provided on Case B implemented by the printing process of FIG. 3. In Case B, the printer 100 does not perform the PIN printing, which is different from the printing performed in Case A. FIG. 6A is sequence diagram continued from T82 in FIG. 2B. Subsequent to T82, the terminal 10, the printer 100, and the server 200 each execute appropriate one or more processing that is the same as or similar to the processing executed in T110 to T116 in FIG. 4A. In T318, the terminal 10 detects input indicating a user selection of the OK button on the print setting screen after the print settings are determined. In Case B, for starting the printing, a PIN code does not need to be entered by the user. In T320, the terminal 10 transmits the CJ Req to the server 200. The transmitted CJ Req includes the image data designated in T110 in FIG. 4A, but does not include a PIN code.

Subsequent to T320, the terminal 10, the printer 100, and the server 200 each execute appropriate one or more processing of T322 to T344. T322 to T344 are the same as or similar to T122 to T144 in FIGS. 4A and 4B, respectively. In T346, the server 200 transmits, to the printer 100, the FJ Res including the job information. In Case B, a PIN code is not assigned by the user on the print setting screen (refer to T318), and thus the job information does not include a PIN code. Subsequent to T346, the printer 100 and the server 200 perform communication therebetween in T348 and T350. T348 and T350 are the same as or similar to T148 and T150 in FIG. 4B, respectively.

In T350, the printer 100 receives, from the server 200, the FD Res including the print data (refer to S16 of FIG. 3). The job information included in the FJ Res does not include a PIN code (S18: NO), and thus the printer 100 starts printing in accordance with the print data in T352 (refer to S40).

In T360, the printer 100 transmits, to the server 200, the UJS Req (Processing) including the Job ID (refer to S42).

In response to, in T360, receiving the UJS Req (Processing) including the Job ID from the printer 100, the server 200 stores, in the memory 234, the status information indicating the status "Processing" in association with the Job ID. In T362, the server 200 transmits the UJS Res to the printer 100. Subsequent to T362, the terminal 10 and the server 200 perform communication therebetween in T370 and T372. T370 and T372 are the same as or similar to T250 and T252 in FIG. 5, respectively. Subsequent to T372, the terminal 10, the printer 100, and the server 200 perform communication therebetween in T374 to T392. T374 to T392 are the same as or similar to T254 to T272 in FIG. 5, respectively.

Correspondences

The terminal 10 is an example of a "terminal". The printer 100 is an example of a "printer". The server 200 is an example of a "server". The UJS Req (Complete) (refer to T160 of FIG. 4B) is an example of a "first notification" or a "completion notification". The UJS Req (Processing) (refer to T360 of FIG. 6B) is an example of a "second notification". The input of the PIN code in T180 of FIG. 4B is an example of a "specific input". The PIN code assigned in the terminal 10 in T118 of FIG. 4A is an example of "first authentication information". The PIN code inputted to the printer 100 in T180 of FIG. 4B is an example of "second authentication information". The FJ Req (refer to T144 of FIG. 4B) is an example of a "first request". The FD Req (refer to T148 of FIG. 4B) is an example of a "second request". The FJ Res (refer to T146 of FIG. 4B) including the job information including the PIN code is an example of a "first response". The FJ Res (refer to T346 of FIG. 6A) including the job information not including the PIN code is an example of a "second response". The FD Res (refer to T150 of FIG. 4B) is an example of a "third response".

Although specific examples of the technique disclosed herein have been described in detail above, these are merely examples and do not limit the scope of the claims. Various modifications and changes of the specific examples described above are included in the technique described in the claims. Modifications of the illustrative embodiment will be described below.

Modification 1

The server 200 might not necessarily generate the print data in T122 of FIG. 4A. In a case where the server 200 does not generate print data in T122, in T150, the server 200 may transmit, to the printer 100, the FD Res including the image data, instead of the print data. In this modification, the image data is an example of "print data".

Modification 2

In the illustrative embodiment, the above-described technique is applied to the PIN printing. Nevertheless, in other modifications, the technique may be applied to another printing method as described below.

Modification 2-1

In one modification, for example, the above-described technique may be applied to another user authentication printing. In the illustrative embodiment, a one-time PIN code is used as user authentication information. Nevertheless, in this modification, other user authentication, for example, a combination of a user ID and a password, may be used. The user authentication information is assigned to each user in advance. In this modification, the user has logged into the terminal 10 using the user authentication information. Therefore, the user does not need to assign the user authentication information (e.g., PIN code) on the print setting screen (refer to T116 of FIG. 4A) displayed on the terminal 10. In response to, in T120, the terminal 10 transmitting the CJ Req including the user authentication information (e.g., the user authentication information used for logging into the terminal 10) to the server 200, the server 200 transmits the job information including the user authentication information to the printer 100. In response to receiving the job information including the user authentication information, in T152, the printer 100 stores the received user authentication information and the print data in the memory 134 in association with each other. In T180, the printer 100 detects input of the user authentication information, instead of the PIN code, through the operation unit 112. In response to successful authentication based on the inputted user authentication information, the printer 100 starts printing in accordance with the print at a associated with the user authentication information. In this modification, the input of the user authentication information is another example of the "specific input". In another modification, in T180, the user authentication information may be inputted to the printer 100 using an authentication card storing the user authentication information. More specifically, for example, the user touches or bring the authentication card to or close to the printer 100, instead of inputting the user authentication information by the user operation on the operation unit 112. In this modification, touching or bringing the authentication card to or close to the printer 100 is another example of the "specific input".

Modification 2-2

In another modification, for example, the above-described technique may be applied to an accumulated printing. In the accumulation printing, the user entry of the authentication information such as a PIN code or user authentication information might not be needed for starting printing. Although the printer 100 receives print data from the server 200, the printer 100 might not start printing in accordance with the received print data immediately. In other words, the printer 100 accumulates and puts the received print data on hold until the printer 100 detects input of a user instruction to start printing. In response to detecting the input of such a user instruction, the printer 100 starts printing in accordance with the accumulated print data. In this modification, in T120 of FIG. 4A, in response to the terminal 10 transmitting, to the server 200, the CJ Req including information indicating that printing to be performed is the accumulated printing, the server 200 transmits, to the printer 100, the job information including the information indicating that printing to be performed is the accumulated printing. In response to receiving the job information including the information indicating that printing to be performed is the accumulated printing, in T152, the printer 100 stores the print data in the memory 134. In response to, in T180, detecting input of an instruction to start printing instead of the input of the PIN code, the printer 100 starts printing in accordance with the accumulated print data. In this modification, the input of the instruction to start printing is another example of the "specific input".

Modification 3

In the illustrative embodiment, although the status of the print job is changed after the printer 100 transmits the UJS Req (Complete) to the server 200 in T160 of FIG. 4B, the printer 100 does not transmit the UJS Req to the server 200. Nevertheless, in this modification, for example, in response to cancellation of the print job after T160 of FIG. 4B, the printer 100 may transmit, to the server 200, the UJS Req indicating that the print job has been cancelled. In other words, the printer 100 may transit, to the server, a notification indicating the status of the print job even after the printer 100 transmits the UJS Req (Complete) (example of the "first notification" or the "completion notification") to the server 200.

Modification 4

The printer 100 may skip T144 to T150 of FIG. 4B. For example, in T142, the printer 100 may receive, from the server 200, the GN (EWM) Res including both of the job information and the print data.

Modification 5

Although the printer 100 receives the job information that does not include a PIN code in T346 of FIG. 6A, the printer 100 may transmit the UJS Req (Complete) to the server 200 prior to completion of the printing. In this case, the printer 100 might not transmit, to the server 200, the UJS Req (Processing) indicating that the printing is being performed.

Modification 6

In the illustrative embodiments, the processing in each step of FIGS. 2 to 6 is realized by software (e.g., the OS program 36, the application 38, and the programs 136, 236). Nevertheless, in other modifications, the processing in at least one of the steps may be realized by hardware such as a logic circuit.

The technical elements described in the present specification or the drawings exhibit technical usefulness alone or in various combinations, and are not limited to the combinations described in the claims at the time of filing. The techniques illustrated in the present specification or the drawings may achieve multiple objects simultaneously, and has technical utility by achieving one of the objects.

What is claimed is:

1. A printer comprising:
a print engine; and
a controller configured to cause the printer to perform:
in response to image data being transmitted from a terminal to a server, receiving print data to be used in printing from the server, the image data representing a target image to be printed, the terminal being different from the printer;
in response to receiving the print data from the server, transmitting a first notification to the server prior to completion of the printing of the target image, the first notification indicating that the printing of the target image has been completed;
subsequent to the transmission of the first notification to the server, detecting a specific input; and
in response to detecting the specific input, causing the print engine to perform the printing of the target image.

2. The printer according to claim 1,
wherein the controller is further configured to cause the printer to perform:
receiving first authentication information from the server,
wherein the specific input includes input of second authentication information,
wherein the causing the print engine to perform the printing of the target image comprises, in response to a determination that the first authentication information matches the specific input, causing the print engine to perform the printing of the target image.

3. The printer according to claim 2, wherein in response to a determination that the first authentication information does not match the second authentication information, the printing of the target image is not performed.

4. The printer according to claim 3,
wherein the first authentication information is entered by the user using the terminal, and
wherein the first authentication information is transmitted from the terminal to the server.

5. The printer according to claim 2,
wherein the controller is further configured to cause the printer to perform:
transmitting a first request to the server,
wherein the receiving the first authentication information comprises, in response to transmitting the first request to the server, receiving a first response or a second response from the server, wherein the first response includes the first authentication information and the second response does not include the first authentication information;
wherein the transmitting the first notification to the server prior to completion of the printing of the target image comprises in response to receiving, from the server, the first response including the first authentication information, transmitting the first notification to the server, and
wherein the controller is further configured to cause the printer to perform:
in response to receiving the second response from the server, transmitting the first notification to the server in response to completion of the printing.

6. The printer according to claim 5,
wherein the controller is further configured to cause the printer to perform:
in response to receiving, from the server, the first response including the first authentication information, transmitting a second request to the server, and
wherein the receiving the print data to be used in the printing from the server comprises, in response to transmitting the second request to the server, receiving a third response including the print data from the server.

7. The printer according to claim 5,
wherein the controller is further configured to cause the printer to perform:
in response to receiving, from the server, the second response not including the first authentication information, transmitting, prior to completion of the printing of the target image, a second notification indicating that the printing is being performed, and
wherein the transmitting the first notification to the server in response to completion of the printing comprises, subsequent to transmitting the second notification to the server, transmitting the first notification in response to completion of the printing.

8. The printer according to claim 1, wherein a notification indicating a status of the printing of the target image is not transmitted to the server after the printer transmits the first notification to the server.

9. A non-transitory computer-readable storage medium storing computer-readable instructions, the instructions, when executed by a controller of a printer, causing the printer to perform:
- in response to image data being transmitted from a terminal to a server, receiving print data to be used in printing from the server, the image data representing a target image to be printed, the terminal being different from the printer;
- in response to receiving the print data from the server, transmitting a completion notification to the server prior to completion of printing of the target image, the completion notification indicating that the printing of the target image has been completed;
- subsequent to the transmission of the completion notification to the server, detecting a specific input; and
- in response to detecting the specific input, causing a print engine to perform the printing of the target image.

10. A printing method comprising:
- in response to a terminal transmitting image data to a server, receiving, at a printer, print data to be used in printing from the server, the image data representing a target image to be printed, the terminal being different from the printer;
- in response to the printer receiving the print data from the server, transmitting, at the printer, a completion notification to the server prior to completion of printing of the target image, the completion notification indicating that the printing of the target image has been completed;
- subsequent to the transmission of the completion notification from the printer to the server, detecting a specific input; and
- in response to detecting the specific input, causing a print engine of the printer to perform the printing of the target image.

* * * * *